(12) United States Patent
Hart et al.

(10) Patent No.: US 12,039,045 B2
(45) Date of Patent: *Jul. 16, 2024

(54) EVENT ANALYSIS IN AN ELECTRIC POWER SYSTEM

(71) Applicant: General Electric Company, Schenectady, NY (US)

(72) Inventors: Philip Joseph Hart, Rexford, NY (US); Honggang Wang, Clifton Park, NY (US)

(73) Assignee: GE DIGITAL HOLDINGS LLC, San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,998

(22) Filed: Dec. 14, 2022

(65) Prior Publication Data

US 2023/0118175 A1 Apr. 20, 2023

Related U.S. Application Data

(63) Continuation of application No. 16/409,189, filed on May 10, 2019, now Pat. No. 11,657,148.

(51) Int. Cl.
*G06F 21/55* (2013.01)
*G01D 3/032* (2006.01)
*G05B 23/02* (2006.01)

(52) U.S. Cl.
CPC .......... *G06F 21/554* (2013.01); *G01D 3/032* (2013.01); *G05B 23/0275* (2013.01); *H02J 2203/20* (2020.01)

(58) Field of Classification Search
CPC .. G06F 21/554; G01D 3/032; G05B 23/0275; H02J 2203/20
See application file for complete search history.

(56) References Cited

U.S. PATENT DOCUMENTS

2009/0302953 A1* 12/2009 Xi .................... H03B 27/00
331/60
2012/0274473 A1* 11/2012 Heda .................... G01H 1/006
340/683

(Continued)

OTHER PUBLICATIONS

"Yazhou Tu et al., Injected and Delivered: Fabricating Implicit Control over Actuation Systems by Spoofing Inertial Sensors, Aug. 15-17, 2018, USENIX, https://www.usenix.org/conference/usenixsecurity18/presentation/tu" (Year: 2018).*

*Primary Examiner* — Santosh R Poudel
(74) *Attorney, Agent, or Firm* — Buckley, Maschoff & Talwalkar LLC

(57) ABSTRACT

According to some embodiments, system and methods are provided including receiving, via a communication interface of an event detection and classification module comprising a processor, data from one or more sensors in a system; determining an event occurred based on the received data; applying a coherency similarity process to the received data via a classification module; determining whether the event is an actual event or a mal-doer event based on an output of the classification module; transmitting the determination of the event as the actual or the mal-doer event; and modifying operation of the system based on the transmitted output. Numerous other aspects are provided.

19 Claims, 8 Drawing Sheets

(56) References Cited

U.S. PATENT DOCUMENTS

| | | | |
|---|---|---|---|
| 2018/0024900 A1* | 1/2018 | Premerlani | G05B 23/0227 |
| | | | 714/41 |
| 2019/0036946 A1* | 1/2019 | Ruvio | H04W 12/106 |
| 2019/0166026 A1* | 5/2019 | Konakalla | G05B 19/048 |

* cited by examiner

| Parameter | Task(s) that the parameter is relevant to | Value |
|---|---|---|
| Window size (number of samples) | Sliding window SVD | 50-200 |
| Number of new samples added (& number of old samples subtracted) prior to new SVD calculation | Sliding window SVD; Collect new samples | 1-10 |
| Number of low-dimensional singular values to observe | Event detection | 1 |
| Threshold for change in singular values between SVD calculations | Event detection | Dependent upon width of data matrix |
| Threshold for ratio of the largest singular value each other singular value | Identification of the most significant singular values of post-event data; Identification of the most important singular vectors; Repository of significant singular vectors from historical events | 0.1 |
| Number of iterative analyses of the power system to perform (equivalent to the number of singular vectors to synthesize) | RSV direction prediction | 1-3 |
| Number of historical events for which to store right singular vectors (RSVs) | Repository of significant singular vectors from historical events | 1-5 |
| Threshold for rotation of the most significant RSV(s) between historical event(s) and the new event, above which the event is considered a cyber-attack | Calculate minimum RSV rotation angle | 20-30 deg. |
| Decision whether to compare most significant RSVs of the new event to (A) RSVs of historical event(s); or (B) synthetic RSVs; or (C) historical RSVs and synthetic RSVs | Calculate minimum RSV rotation angle | C when both are available; otherwise, either A or B |

FIG. 6

EVENT ANALYSIS IN AN ELECTRIC POWER SYSTEM

CROSS REFERENCE TO RELATED APPLICATIONS

This application is a continuation of U.S. patent application Ser. No. 16/409,189, entitled "EVENT ANALYSIS IN AN ELECTRIC POWER SYSTEM" and filed May 10, 2019. The entire contents of this application are incorporated herein by reference.

BACKGROUND

Power systems typically include a large network of sensors referred to as a wide-area monitoring system (WAMS). The sensors measure certain characteristics and qualities in the power system (e.g., voltage and current) and different types of power (active and reactive). The WAMS may provide data to a control operator, who may use the provided data to make decisions about the operation of the power system.

One or more of the sensors may be compromised by a malicious adversary (e.g., mal-doer), who may inject false data prior to the data's provision to the control operator. The false data may trick the control operator into thinking a fault has occurred, and to implement protective actions, potentially resulting in lost load.

Therefore, it would be desirable to provide a system and method that determines whether an event is an actual event or a malicious attack.

BRIEF DESCRIPTION

According to some embodiments, a method includes receiving, via a communication interface of an event detection and classification module comprising a processor, data from one or more sensors in a system; determining an event occurred based on the received data; applying a coherency similarity process to the received data via an event classification module; determining whether the event is an actual event or a mal-doer event based on an output of the event classification module; transmitting the determination of the event as the actual or the mal-doer event; and modifying operation of the system based on the transmitted output.

According to some embodiments, a system includes an event detection and classification module, including an event detection module and a classification module; an event detection and classification processor; and a memory storing program instructions, the event detection and classification processor and the event detection and classification module operative with the program instructions to perform the functions as follows: receive data from one or more sensors in a system; determine an event occurred based on the received data; apply a coherency similarity process to the received data; determine whether the event is an actual event or a mal-doer event based on an output of the event classification module; transmit the determination of the event as the actual or the mal-doer event; and modify operation of the system based on the transmitted output.

According to some embodiments, a non-transitory computer readable medium stores instructions that, when executed by a computer processor, cause the computer processor to perform a method including: receiving, via a communication interface of an event detection and classification module comprising a processor, data from one or more sensors in a system; determining an event occurred based on the received data; applying a coherency similarity process to the received data via an event classification module; determining whether the event is an actual event or a mal-doer event based on an output of the event classification module; transmitting the determination of the event as the actual or the mal-doer event; and modifying operation of the system based on the transmitted output.

A technical effect of some embodiments of the invention is an improved technique and system for detecting an event and classifying the event as an actual physical event or bad data/malicious event that mimics a physical event behavior. The inventors note that due to the rarity of severe physical fault events within the power system that can be used for online training of a conventional anomaly detection process, exclusive reliance on data-driven methods for online training may limit the accuracy of the process. In addition to online training, embodiments may provide of offline training using control center data in a manner that is limited and infrequent. To resolve the limits of data-driven-only methods, embodiments provide for a process that integrates a data-driven and a physics-model-based approach to classify the event as well as be trained for future classification. Embodiments may make use of known physical properties of power networks, depending on spatiotemporal correlations and physics-based principles that can be applied to power grids. In contrast to conventional cyber attack detection processes for power systems, one or more embodiments provide for: 1. In addition to detecting unsophisticated cyber attacks on sensor data (e.g., random data injection, or zero value injection), the process may detect simultaneous cyber-attacks on multiple sensors, including sophisticated data replay attacks, with high accuracy; 2. Detection of cyber attacks on sensor channels outside of, or at the extreme periphery of, the power system control center, such as at a Phasor Data Concentrator (PDC), with a high degree of autonomy; 3. A combination of highly-compatible model-based and data-driven training mechanisms that allow for a greater accuracy in event classification; and 4. Human-in-the-loop supervised learning for decision threshold calibration.

Embodiments provide for an event detection and classification module for use with a WAMS within a power system. The event detection and classification module may detect cyberattacks on the physical layer of the WAMS network, i.e., content within the sensor data itself. The event detection and classification module may detect a wide range of cyberattacks on sensor data, including sophisticated replay cyberattacks on one or more sensors. The event detection and classification module may be implemented as a component of the PDC data quality reporting service, and/or as a preconditioning step within WAMS applications at the control center, in either case to reduce the attack surface of the control center by cyber-hardening sensor data in an online manner. Embodiments provide for the event detection and classification module to discern actual physical fault events (e.g., short circuits, line faults, etc.) from mal-doer events (e.g., spoofed events that mimic fault-like behavior). It is noted that unlike conventional detection processes that necessitate close interaction with the Energy Management System (EMS) tool, such as state-estimation-based anomaly detection, one or more embodiments provide for an event detection and classification module that may operate nearly autonomously from the control center and has minimal interaction with the EMS. The embodiment may be used in coordination with an additional data estimation algorithm to reduce the attack surface of the control center through cyber-hardening a key channel into the EMS that would otherwise be available to the mal-doer, as described further below.

It is also noted, in contrast to conventional power grid anomaly detection processes, embodiments may focus on the measurement and control system associated with an entire power grid, rather than on the measurement and control system associated with a single component (e.g., a power plant) within the power grid. In one or more embodiments, the event detection and classification module may provide high true positive and true negative rates for cyber-attack and fault classification. The event detection and classification module may minimize the requirement for continuous interaction between the module and the EMS, and minimize the effort needed for training the module by relying on both a data—and physics-model driven process, allowing the module to conveniently reside at the PDC or at the extreme periphery of EMS applications. The need for interaction with the EMS and the need for training by operators at the control center are minimized using one or more embodiments because unlike conventional event detection algorithms, the event detection and classification module does not rely wholly upon state estimation algorithms which are typically required to be closely integrated with the EMS system. Since the power system changes over time, the model used by the event detection and classification module may occasionally be updated using power system information communicated from the EMS, in the interest of obtaining higher true positive and true negative classification rates. However, only an infrequent update to the model parameters is required to be provided by the EMS for the event detection and classification module to maintain relatively high true positive and true negative classification rates. Since only infrequent, low-bandwidth data transfer is needed between the EMS and the event detection and classification module, and non-deterministic, high-latency data transfer is permissible, a variety of secure communications infrastructure and protocols already exist that may allow the event detection and classification module to be placed anywhere within the power system. State-estimation-based event classification algorithms may be closely integrated with the EMS and depend upon a relatively accurate physics-based-model to obtain satisfactory true positive and true negative rates. In contrast, because the data driven component of the event detection and classification module has only a small degree of dependence upon the physics-model-based component, the event detection and classification module may still obtain high true positive and true negative rates even if changes in the physical power system, which may occur during the time period in between model updates, have made the physics-based-model somewhat less accurate. While the event detection and classification module may function with a slightly diminished performance under such circumstances, the reduction in performance may not be as severe as that which may occur for conventional state-estimation-based classification algorithms.

The event detection and classification module may, in embodiments, combine a data driven analysis, where different events are monitored, with a physics-based analysis of the power system. The physics-based analysis may include a coherency analysis. Regarding coherency, the coherent synchronous machines (generators) signify a group of generating units the rotors of which are moving with approximately the same mode of oscillation. It is common to combine multiple machines into a single machine during system simulation to reduce the computation load without affecting the accuracy of transient stability analysis. Due to the physics of the power system, the power system may respond in a particular manner to a given event (e.g., fault, line trip, etc.). The sensors may be disbursed enough throughout the power system (e.g., where a "sensor" may be referred to herein as a "node" and different nodes at different locations) such that they capture a picture of how the power system responds to an event. For example, certain nodes may respond in a specific manner to an event. There may be an oscillation in the different measurements (voltage/current), detected by the nodes, temporarily if a large fault is experienced. After the oscillation, the measurements settle down to an equilibrium. The coherency analysis may determine which nodes oscillate together synchronously before they settle back to equilibrium, and which nodes oscillate out of phase before they settle back to equilibrium. This determination may be based on, for example, knowledge about where the nodes are placed in the circuit (e.g., the electrical proximity of the nodes), electrical impedance of the transmission lines, result of properties of the sensors, inertia, damping properties, where major load centers are in the power system, and any other suitable property. After the event detection and classification module detects an event, the module classifies the event as an actual physical event or a mal-doer event. The classification is based, in part, on the coherency analysis. The module may determine whether the received event data matches the expected behavior of the nodes based on the coherency analysis (e.g., were the two or more nodes that reported the event data coherently related to each other, as determined prior to the classification analysis, and was their output consistent with what was expected based on their coherency relation). When the received event data matches the expected behavior, within a threshold, in some instances, the event may be classified as an actual physical event. When the received event data does not match the expected behavior, within the threshold, in some instances, the event may be classified as a mal-doer event.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

BRIEF DESCRIPTION OF DRAWINGS

FIG. 6 illustrates a chart according to some embodiments.

DETAILED DESCRIPTION

Figure 1:
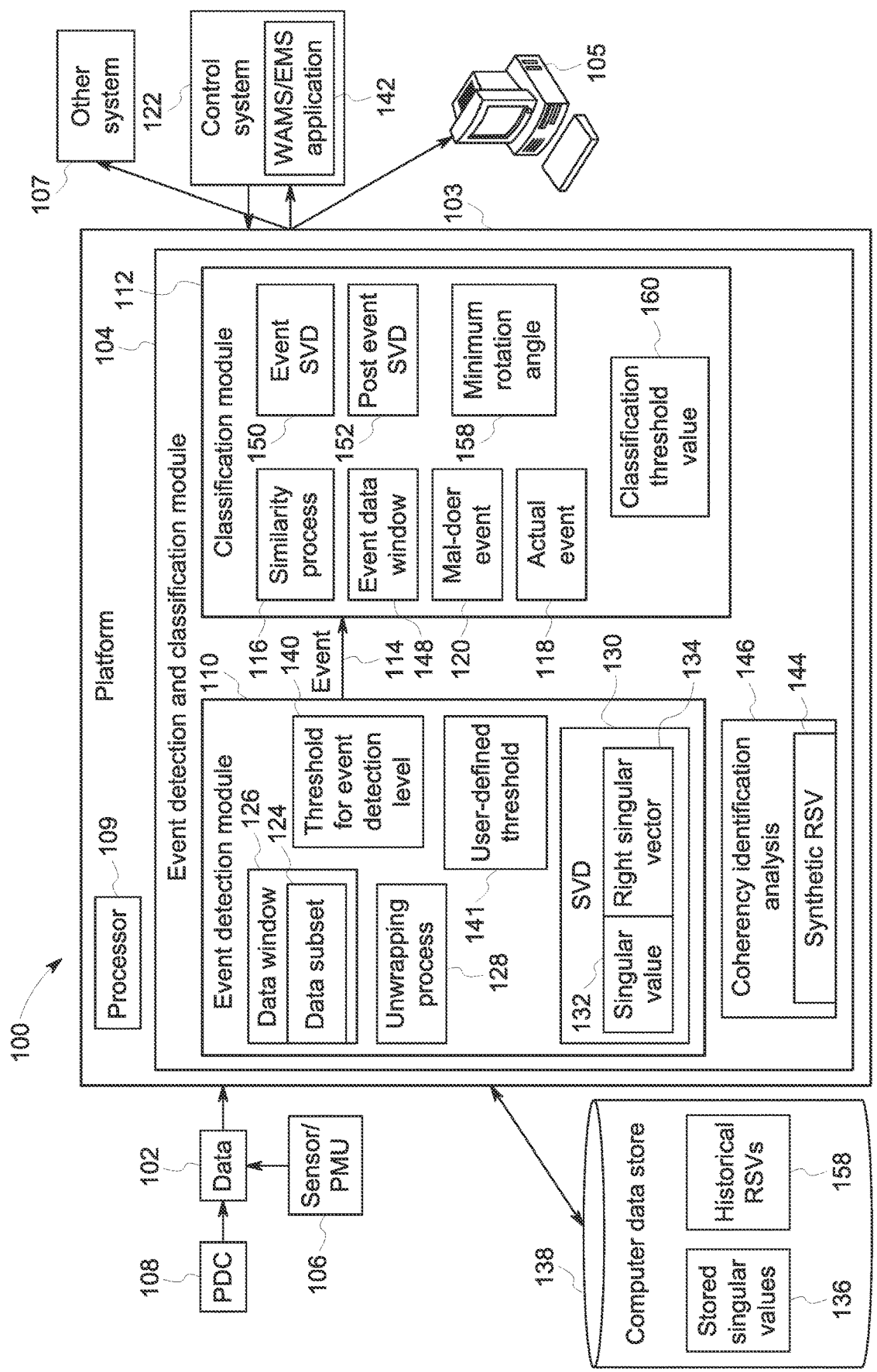
FIG. 1 illustrates a system according to some embodiments.
Figure 2:
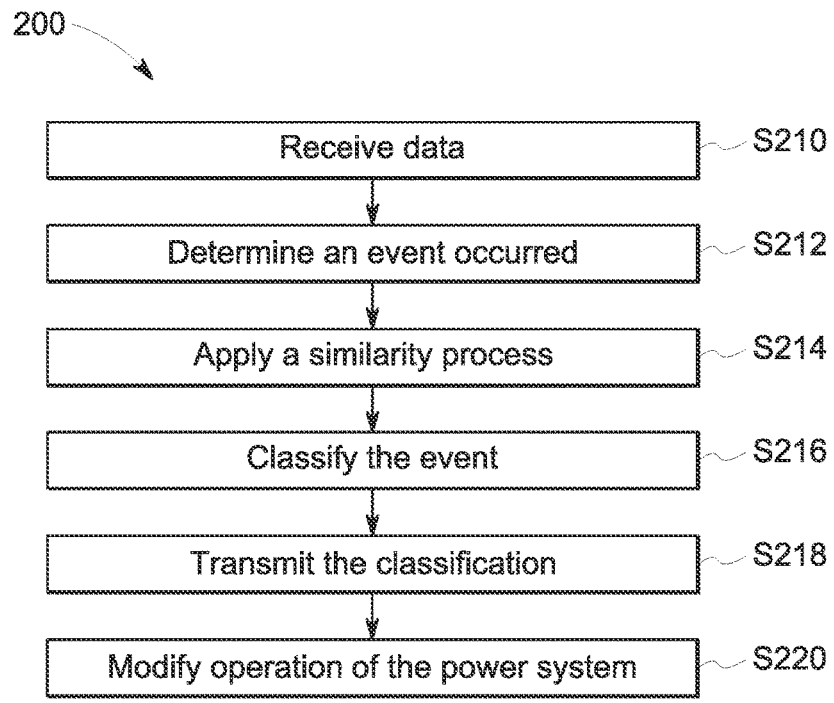
FIG. 2 illustrates a flow diagram according to some embodiments.

As described above, a power system may include a large network of sensors. As used herein, the terms "power system" and "power grid" may be used interchangeably. The sensors may be referred to as phasor measurement units (PMU)s. The PMUs may collect synchrophasor measurement data (e.g., voltage and current). A Phasor Data Concentrator (PDC) aggregates the data streams from multiple PMUs distributed through the power system and then sends the aggregated data to a power system control center for analysis. Synchrophasor measurement data ("synchrophasor data") from PMUs may facilitate the operation of a number of control room Energy Management System (EMS) tools, including but not limited to, rapid and robust linear state estimation, online monitoring of voltage stability, and analysis of poorly-damped oscillations. However, since important control decisions may be executed based on input from this monitoring system (WAMS), synchrophasor data represents a cybersecurity vulnerability. An adversary with malicious intent ("mal-doer") may compromise one or more PMUs in order to effect control decisions that unnecessarily disrupt typical grid operations.

Once one or more PMUs have been compromised by the mal-doer, this mal-doer may inject false data at the site of the compromised PMUs, potentially even injecting spoofed or pre-recorded phasor transients that may conceivably be observed during a real fault event. Such false data may trick a human operator and/or automated controller at the power system control center to believe that fault has occurred and to implement protective or other actions (e.g., open a transmission line/divert power from one area to another, etc.), potentially resulting in lost load. In the case of a cyberattack on a large number of PMU channels, the injected false data signals may even display a superficial consistency with network physics, making it difficult even for an experienced human operator to detect, at little additional cost to the mal-doer.

In one or more embodiments, the event detection and classification module may use a transformation of a moving window of synchrophasor measurements to output a set of spatiotemporal correlations uniquely associated with the power system being monitored. It is noted that these correlations are difficult to spoof unless every single PMU is compromised: they may be less apparent or absent if only a subset of the synchrophasor measurements are spoofed by the mal-doer. Spatiotemporal correlations may exist for 3-phase, sparsely-connected, reactive power grids of arbitrary size and interconnection, under various states of time-varying load and generation, or power grid with other suitable characteristics.

Turning to FIGS. 1-6 and 8, a system 100 and diagrams of examples of operation according to some embodiments are provided. In particular, FIGS. 2-4 each provide a flow diagram of a process 200/300/400, according to some embodiments. Processes 200/300/400 and other processes described herein may be performed using any suitable combination of hardware (e.g., circuit(s)), software or manual means. In one or more embodiments, the system 100 is conditioned to perform the processes 200/300/400 such that the system is a special-purpose element configured to perform operations not performable by a general-purpose computer or device. Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto.

Initially at S210, data 102 is received at an event detection and classification module 104 ("module"). The data 102 may be in the form of an electrical signal and may include synchrophasor data, including but not limited to, voltage angle, current angle, voltage magnitude, current magnitude, and active power. In one or more embodiments, the data 102 may be received from sensors 106 (e.g., PMUs or any other suitable sensor) or a PDC 108. As used herein, the terms "sensors" and "PMUs" and "nodes" may be used interchangeably. In one or more embodiments, system topological information 107 (FIG. 8) may also be received as part of the data 102. Topological information may include the following: information regarding the location of generators within the power system network; information about each generator (including, but not limited to, the generator inertia and typical power output); information regarding the location of major loads in the network; location of phasor measurement units (PMUs) in the network; information regarding the network admittance matrix (e.g., the locations to which each transmission line is connected (i.e., information regarding the interconnection of the transmission lines)); and the impedance of each transmission line. Other suitable topological information may be included. In one or more embodiments, the event detection and classification module 104 may include an event detection module 110 and a classification module 112.

Then in S212, the event detection module 110 determines an event 114 occurred based on the received data 102. As described further below with respect to FIG. 3, the event detection module 110 may detect a change in measurements of the data reported by the PMUs, where the change is within a pre-set magnitude and within a certain amount of time. As used herein, an "event" is any disturbance in the power system that may be an actual physical fault (actual physical event) or a cyberattack (mal-doer event).

Next, in S214, the classification module 112 applies a similarity process 116 to the received data. In one or more embodiments, the similarity process 116 may use a coherency analysis to determine whether the received data is similar, within a threshold value/range of values, to expected data for the event. The execution of the classification module 112 will be further described below with respect to FIG. 4.

After application of the similarity process 116, the classification module 112 classifies in S216 the event as an actual physical event 118 or a mal-doer event 120 based on the output of the similarity process. It is noted that the mal-doer event 120 may include bad data that was not the result of a malicious attack. The classification of the event is then transmitted in S218. The classification, in one or more embodiments, may be received by the control system 122. The control system 122 may include a user or another system. In one or more embodiments, operation of the power system 100 is modified in S220 based on the transmitted classification. As a non-exhaustive example, upon observing through visual inspection of WAMS-based data that there appears to have been a fault in the system, the control operators in the control center of the power system may issue a command to remotely open one or more switches to stop the flow of electricity on transmission lines close to the fault. This action may isolate the fault and thereby stabilize the system. The action of opening one or more switches may result in loss of power for electricity consumers in close proximity to the estimated location of the fault (i.e., 'loss of load'), and quality of service for those consumers may be sacrificed in order to obtain stable service for the broader grid. In a replay cyberattack (e.g., where a valid data transmission is maliciously or fraudulently repeated or delayed), a mal-doer may compromise several PMUs and intentionally inject malicious synchrophasor data that causes the control operators to believe that there has been a fault when there actually has not been one, and thereby trick the operators to mistakenly open the switches, resulting in unnecessary loss of load. If the classification module were used by an operator to correctly classify this event as a cyberattack, the operator would not open the switches and the undesirable loss of load would not occur.

Figure 3:
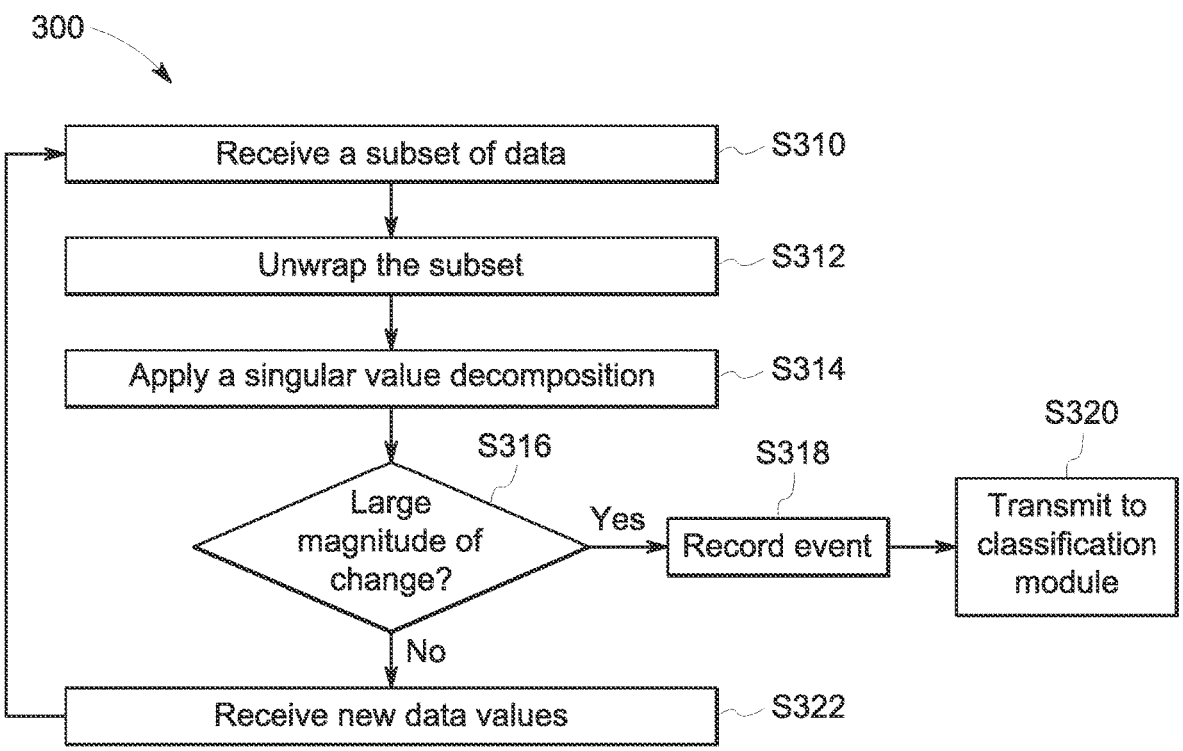
FIG. 3 illustrates a flow diagram according to some embodiments.

Turning to FIG. 3, a flow diagram of the detection process 300 is provided. In S310, a sub-set 124 of the data received in S210, as described above, is determined. In one or more embodiments, the subset may be less than all of the received data, or the subset may include all of the received data (e.g., mathematically, the full set counts as a subset of a set). The sub-set of data 124 may be the data in a given data window 126 ("window"). The sub-set of data 124 may have a window length that is several hundred samples long, or any other suitable length, with a width determined by a number of synchrophasor measurement variables. It is noted that a matrix of synchrophasor data may include columns of time-stamped samples, with each column corresponding to a different measurement variable, including but not limited to, voltage obtained from a voltage sensor, current obtained from a current sensor, active power, reactive power, or frequency. Active power, reactive power and frequency may be computed using voltage and current samples. In one or more embodiments, a window length may be selected remotely by a control room operator or by any individual whose task it is to initially install, commission, or periodically calibrate the unit. Typically, power system variables (such as the voltage angle of a node) will oscillate after an event with one or more oscillatory frequencies (also known as oscillatory modes). For example, the periods of each oscillatory mode may range from less than 0.1 seconds for the fastest oscillatory modes to over 5 seconds for the slowest oscillatory modes. The window length may be selected such that it captures the full period of the slowest oscillatory mode: e.g., if the period of the slowest mode is 4.2 seconds, the window may include 4.2 seconds of synchrophasor data to capture one full period. In one or more embodiments, in instances that the following factors: network admittance network (e.g., transmission line interconnection, transmission line impedances), location and inertia of generators, and approximate location and magnitude of loads are known, the window size may be determined based on a modal analysis of a Kron-reduced, linearized version of the nonlinear electromechanical swing equations using these factors. It is noted that knowledge of the transmission line interconnection and transmission line impedances is sufficient to calculate the network admittance matrix, and if one has the network admittance matrix, one can back-calculate the interconnection and impedances. In instances that the network admittance matrix, location and inertia of generators, and approximate location and magnitude of loads is not known, window size may be determined from an online estimation of the slowest system modes.

In one or more embodiments, the window 126 may be a sliding window. To create the window 126, at every time step, the new "X" samples of data may be added to the sliding window (data matrix) while the same number of the oldest "X" samples of data are discarded.

Then, in S312, the sub-set of data is "unwrapped." In the unwrapping process 12, unwrapping the subset of data 124 may include correcting any discontinuities resulting from a roll-over of phase angle from $2\pi$ to $-2\pi$ (or vice-versa), due to off-nominal frequency conditions, or any other reasons. In one or more embodiments, unwrapping may also include the removal of an angle ramp caused by the off-nominal frequency conditions by subtracting the average angle transient, calculated across all nodes, from each node.

Next, in S314, the event detection module 110 may apply a singular value decomposition (SVD) 130 on the unwrapped data to output a number of singular values 132 and right singular vectors 134 equal to the number of measurement variables. It is noted that the number of singular values is equal to the number of right singular vectors, which is equal to the number of measurement variables. It is also noted that a single right singular vector has a number of elements equal to the number of measurement variables.

As a non-exhaustive example, the received data 102/subset of data 124 may include voltage angle measurements from two or more PMUs 106. While the processes herein are described with respect to voltage angles, other suitable PMU parameters may be used.

In S316 it is determined whether there has been a large magnitude of change. The event detection module 110 may analyze low-dimensional singular values 132 by comparing them to one or more low-dimensional stored singular values 136 in S316 to output whether the magnitude of change is large or not. A magnitude of change is considered "large" when it surpasses a user-defined threshold for event detection level 140. A large magnitude of change in any of the examined singular values between two consecutive data windows may indicate a major event has occurred. A singular value may be considered "low-dimensional" when, for example, its size surpasses a user-defined threshold 141, or when the ratio between that singular value and the largest singular value surpasses a user-defined threshold. The one or more stored singular values 136 may be stored in a datastore/repository 140. The stored singular values 136 may be obtained, prior to storage in the data store 140, from a previous time window.

When it is determined in S316 that a large magnitude of change (e.g., the magnitude of change surpasses the predefined threshold for event detection level 140), a "new event"/event 114 has been identified, and the estimated time at which the new event began is recorded in S318. Then in S320 the subset 124 of the received data is transmitted to the classification module 112 and process 400 is invoked.

In one or more embodiments, the SVD 130 may be received by the classification module 112 directly, without calculating an event SVD 150, as described below. The SVD 130 may include at least one, but possibly multiple singular values and right singular vectors (each of the collected low dimensional singular values may have a singular vector that corresponds to it).

When it is determined in S316 that a large magnitude of change has not occurred, (e.g., the threshold for event detection level 140 has not been surpassed), then no event is detected, and the process 300 proceeds to S322, where new data values are received, as in S210, to be added to a next time window and the process S300 returns to S310.

In one or more embodiments, prior to execution of the classification module 112 in 400, the classification module 112 may be trained using a power network coherency identification analysis, when topological data is made available to the classification module 112 by the energy management system (EMS) 142, human operator at the control center, or any other suitable party. In the electromechanical timescale, the transient behavior of voltages and currents at each node of the power system may be contingent upon a set of well-known nonlinear differential equations and algebraic constraints. The power network coherency analysis may use these equations and constraints to partition the network into clusters of nodes that are predicted to respond in a similar manner to a large transient. The SVD may serve as an effective data-driven alternative to model-based coherency identification algorithms, where the use of the SVD is for coherency identification. This is due to the right singular vectors obtained in the SVD of a data window capturing a transient offering information into which nodes are responding in a like manner to that transient.

In one or more embodiments, the power network node coherency may be represented by right singular vector(s) corresponding to a largest singular value(s) obtained from application of the SVD upon the time window data. The analysis of the power system, including a network admittance matrix, location and inertia of generators, and approximate location and magnitude of loads, may be performed to develop a prediction regarding the direction of the right singular vector (RSV) 134 associated with the lowest-dimensional singular value 132 (as determined in S314). This prediction may be referred to herein as a "synthetic" RSV 144 or a "synthetic coherency value". It is noted that the synthetic RSV may be updated periodically, on-the-fly, or offline.

Figure 5A:
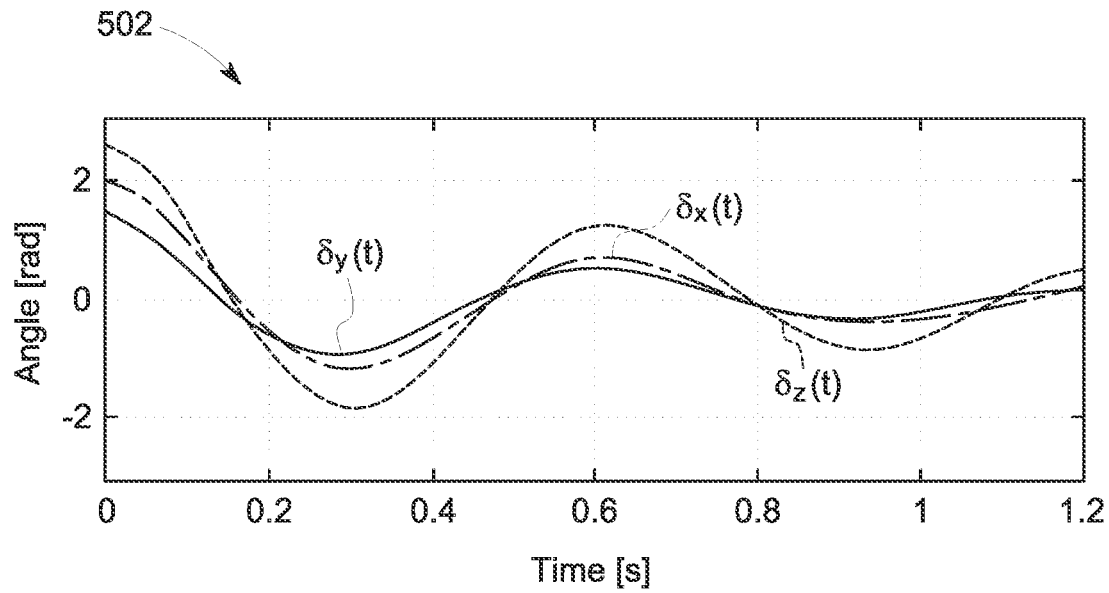
FIGS. 5A-C illustrate charts including a non-exhaustive example according to some embodiments.
Figure 5B:
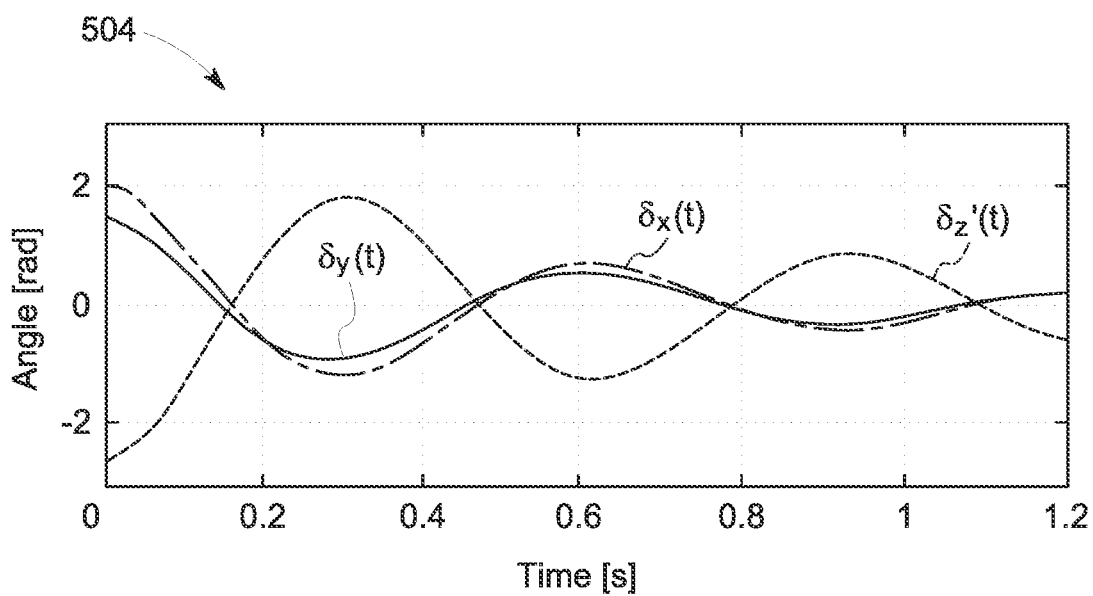
Figure 5C:
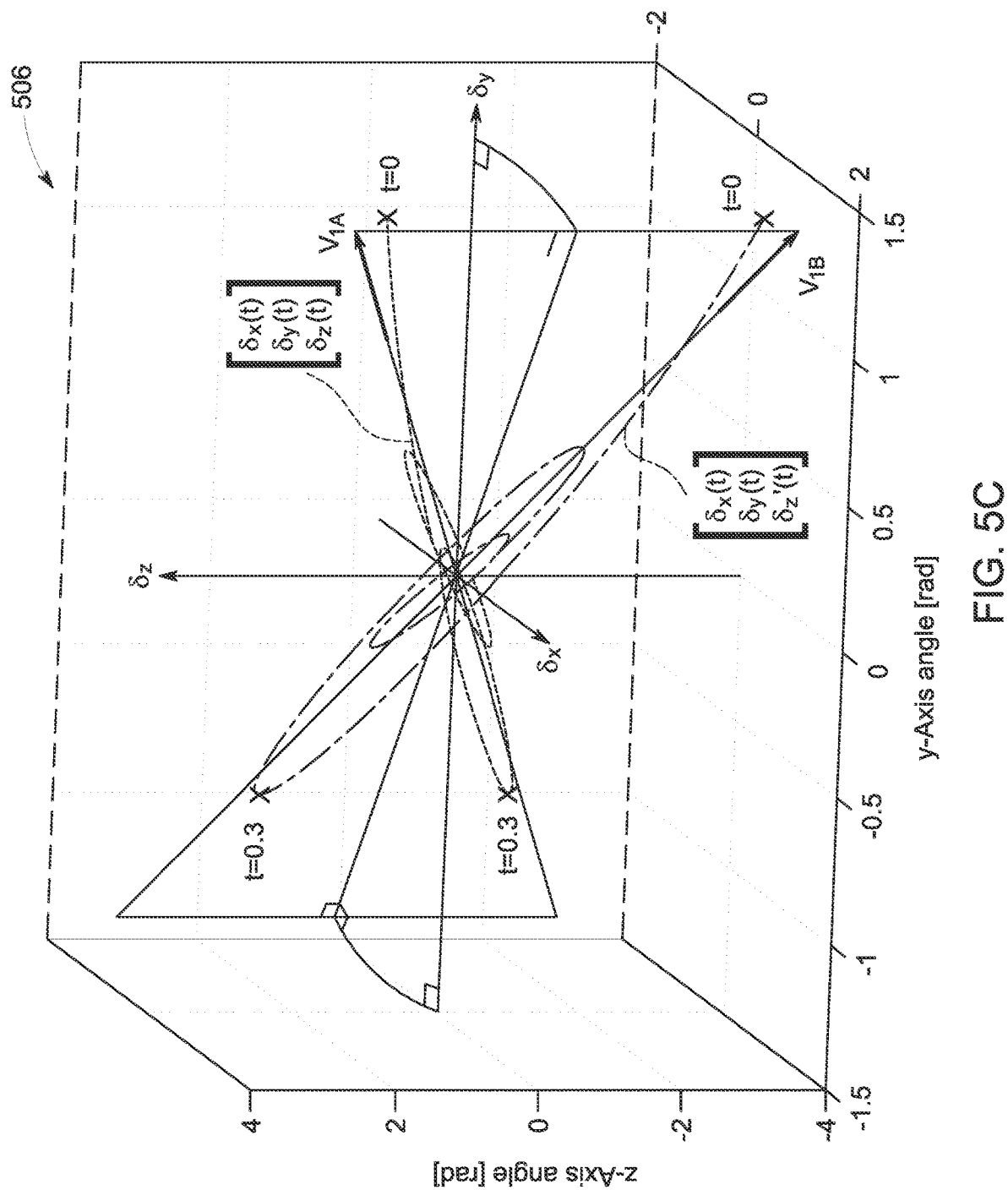

As a non-exhaustive example, for a simple three-node power system, FIGS. 5A-C demonstrate the impact of coherency or lack thereof on the direction of the right singular vectors obtained from the SVD. A matrix of PMU angle data is used, with a number of columns equal to the number of power system nodes at which angle has been measured—i.e., the number of variables (3, in this example)—and a number of rows equal to the number of measurement samples within the time window. For each row in the matrix of PMU angle data, the average across the row is calculated and subtracted from each element in that row. The SVD is then applied to the time window of PMU angle data processed in this manner. For the parametric curve defined by the time-varying angle signals, the right singular vector associated with the largest singular value gives the "best fit" line in three-dimensional space. If all elements within the RSV have the same sign and similar magnitudes, this is an indication that all of the nodes are responding in a coherent manner. A mixture of positive and negative elements within the RSV provide evidence of incoherency between some of the nodes. Given a well-timed window of data that is of sufficient length to capture at least one full period of the damped oscillatory electromechanical swing behavior that follows a major event, the direction of the calculated RSV serves as a highly valuable signature that encodes unique, deterministic, and relatively invariable physical properties of the power system. FIGS. 5A and 5B show two different cases of time-domain PMU angle signals (FIG. 5A shows Case A angle signals vs. time 502 and FIG. 5B shows Case B angle signals vs. time 504). FIG. 5C shows a 3-dimensional parametric curve (of angle signals vs. time) associated with FIGS. 5A and 5B, and a visualization of the (most significant) right singular vector obtained from the SVD 506.

In one or more embodiments, the synthetic RSV 144 ("synthetic coherency value") may be generated using results of the power network coherency identification analysis 146. A zero vector may first be created to leverage a branch cutset identified by a single iteration of the coherency identification analysis 146 to create a synthetic RSV 144. This zero vector may be of length equal to a number of variables present in the data window 126, wherein the elements of the zero vector may be associated with the measurement variables such that the first element of the zero vector corresponds to the variable associated with the left-most column of the data window and the last element of the zero vector corresponds to the variable associated with the right-most column of the data window 126. The coherency identification analysis 146, when applied to a portion of the network (or the entire network), may assign all nodes within the network subset or entire network to either Cluster 1 or Cluster 2. The assignment may be based on which side of the identified branch cutset the node lies. In the instance that the coherency identification analysis 146 is applied to a collection of nodes in the network that includes a subset of PMUs 106 (possibly all the PMUs)—a '1' or '−1' may be assigned to the element of the synthetic RSV 144 corresponding to each PMU 106 within the subset depending on whether that PMU is located at a node that is in Cluster 1 or Cluster 2, respectively. All other elements within the synthetic RSV 144 may remain zero, since they were not included within the boundaries of the portion of the network subject to the coherency identification analysis. Next, the synthesized RSV may be normalized to have a magnitude of one (1).

The online training of the classification module 112 may be supplemented or replaced by this power network coherency identification analysis 146. In one or more embodiments, the power network coherency identification analysis 146 may be performed at an initial deployment of the classification module 112 and/or at infrequent intervals thereafter. In one or more embodiments, the coherency identification analysis 146 may be used to manually train the classification module 112. In one or more embodiments, the coherency identification analysis 146 may be used in the computation of the smallest rotation angles, described below with respect to S416. As a non-exhaustive example of a network coherency identification strategy, Generalized Eigenvale Perturbation (GEP) analysis, or any other suitable analysis, may be used in the generation of "synthetic right singular vectors" 144. It is noted that the GEP analysis accounts for electromechanical dynamics of the generators, while still employing a structure-preserving approach (i.e., it partitions load buses, and not just generator buses). With the non-exhaustive example of GEP analysis for coherency identification, the coherency identification analysis may optionally be performed iteratively, with each subsequent application of the GEP analysis producing a prediction for the direction of an additional right singular vector (RSV) (synthetic RSV) associated with an additional low-dimensional singular value. This may be interpreted as developing a synthetic RSV 144. The number of iterations of the analysis may be specified by a parameter.

Figure 4:
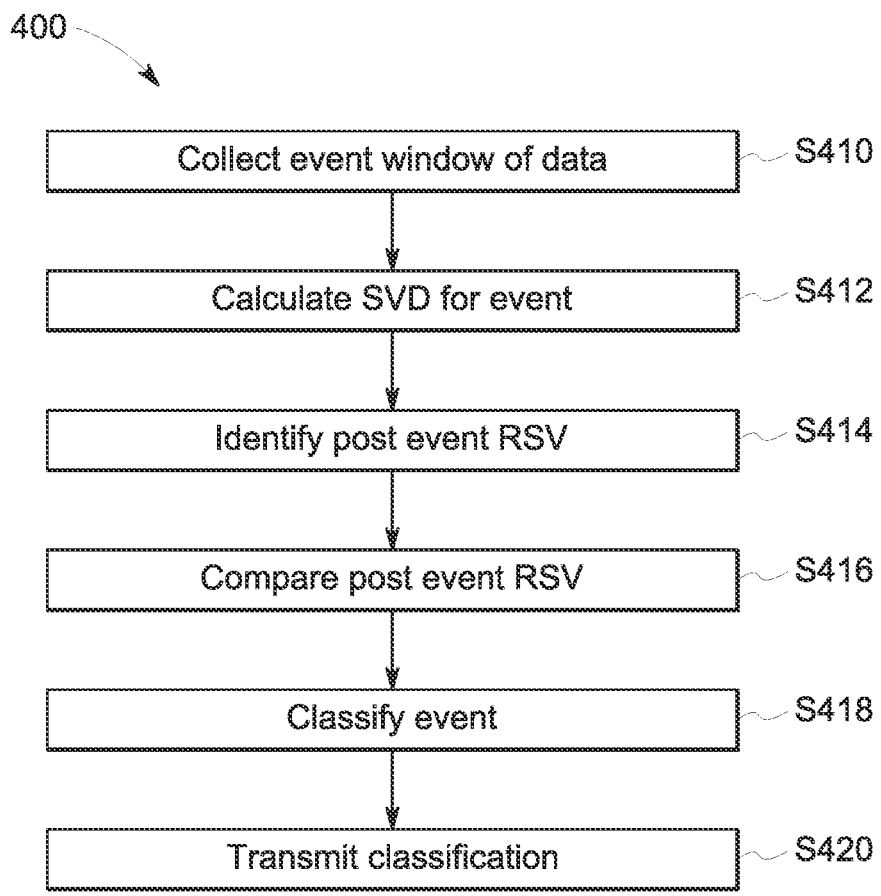
FIG. 4 illustrates a flow diagram according to some embodiments.

Turning to FIG. 4, a flow diagram of the classification process 400 is provided, to classify the event 114 as one of an actual event 118 and a mal-doer event 120.

Initially, at S410, a full event window of data 148, with length equal to the analysis data window 126 in S310, is collected, starting from a point in time near to when the event first began. In one or more embodiments, the full event window of data 148 may be collected from the detection module or directly from sensors 106/PDC 108. In one or more embodiments, an estimate for this beginning time is provided by the event detection module 110, using the recorded estimated event time. Then in S412, an event SVD 150 is calculated for the data in the event data window 148, and the significant (e.g., largest) singular values of a post-event data window are identified. In one or more embodiments, the significant singular values are identified by determining a ratio of the largest singular value to each of the other singular values. When the ratio exceeds (or falls below, depending on the construction) a threshold value, that singular value is considered significant. Next, in S414, post event RSVs 152 associated with each of the most significant singular values are identified. Each of the post event RSVs 152 of the event are compared in S416 with one of: (a) RSVs in a historical event repository 156 "historical RSVs" or "historical coherency value" generated from time windows of data collected at an earlier point in time during one or more historical events; (b) a repository of synthetic RSVs 144 generated from a model-based coherency identification analysis, as described above, or (c) a combination of historical RSVs 156 and synthetic RSVs 144. In one or more embodiments, the synthetic RSVs 144 and historical RSVs may be referred to as "reference values". In one or more embodiments, the similarity statistic (e.g., coherency) may be computed between a new RSV for the event and any of the historical or synthesized RSVs, based on their availability. In one or more embodiments, the similarity statistics may be updated for every new window.

In one or more embodiments, right singular vectors from historical events 156 may be stored in a repository/data store 138. The singular vectors in the repository may be associated with significant values that had been considered, at an earlier time, to be significant, as describes above in S412.

In one or more embodiments, the comparison for each of the post event RSVs is made by the classification module computing the smallest rotation angle between the post event RSV 152 and any of the historical RSV 156 or synthesized RSVs 144. In one or more embodiments, the post event RSV 152 is compared to each historical RSV 156 and each synthesized RSV, and then the smallest RSV is used for further analysis. The rotation angle between any two RSVs may be defined by arc-cosine of a dot product of the two RSVs. It is noted that no RSV information is sacrificed (as would be the case in, e.g., a clustering analysis) since the full RSV may be used for this rotation angle computation.

The smallest computed rotation angle for each RSV are grouped to form a set. From the set of smallest vector rotation angles, a smallest rotation angle is selected to serve as a minimum rotation angle 158 for the event. This minimum rotation angle 158 may be compared in S418 to a classification threshold value 160. The classification threshold value may be a predetermined value or range of values. The classification threshold value may be updated based on at least one of: an output of the event classification module; via a user interface by an operator; and learning acquired by the operator per the historical data. In one or more embodiments, the classification threshold value may be updated automatically. When the minimum rotation angle 158 exceeds the classification threshold value 160, the event is classified as one of a mal-doer event 120 (e.g., cyber-attack/bad data event) or an actual physical event. When the minimum rotation angle 158 is less than the classification threshold value 160, the event is classified as the other of the mal-doer event 120 and the actual event 118. The classification is transmitted to at least one of a user in a control center or another system in S420, as described above with respect to S218, and the process 400 ends.

It is noted that while rotation angle is used herein, this is a non-exhaustive example, and other measures of similarity between RSVs may be used, including, but not limited to Euclidean distance, Manhattan distance, and Chebyshev distance.

In one or more embodiments, when the event 114 is classified as an actual event 118, the significant RSVs for the time window associated with the event may be added to the historical event repository 158, and the set of RSVs corresponding to the oldest event within this repository is discarded.

In one or more embodiments, the threshold for event detection 140 may vary with time, as it may be re-calibrated using a human-in-the-loop supervised learning or an automatic monitoring system.

With respect to the human-in-the-loop aspect, for this re-calibration, the last several minutes' worth of synchrophasor data is stored in a relatively large sliding window of data called a "calibration dataset." The relatively large sliding window may consist of many thousands of samples or any other suitable number. At every time step, the latest "X" samples of synchrophasor data are added to the calibration dataset while the oldest "X" samples of data are discarded. A human in a power system control center may monitor the raw synchrophasor data on a user interface 105, as well as the output of the event detection module 110 and the classification module 112, and may observe a significant event (e.g., evidence of a physical fault or a mal-doer event), that was not detected by the detection module 110, which is known as false positive rate or fall-out rate. In one or more embodiments, the user may then indicate (e.g., via selection of a control on the user interface) that the event detection module 110 has failed to properly detect a recent event. The calibration dataset may then be frozen (e.g., no new samples are added, and no samples are discarded). The sliding window SVD analysis in S314 may then be repeated on the entire calibration dataset, and the largest change in singular values between any two consecutive analysis data windows with the calibration dataset is recorded. A re-calibration action may then be performed, in which the event detection threshold 140 is lowered to this largest recorded change in singular values. Alternatively, the user in a control center may monitor the synchrophasor data and may observe that an event was detected by the event detection module 110, even though the user did not observe any significant event. This is also known as false negative rate or miss rate. In this instance, the user may indicate (e.g., via selection of a control on the user interface), that the event detection module is too sensitive and may be re-calibrated. Then, a similar re-calibration procedure, as discussed above, is executed and the event detection threshold may be raised by an extent necessary to ensure that the detection threshold would not have been surpassed by the recent events. It is noted that similar human-in-the-loop supervised learning may be implemented for re-calibration of the angle rotation threshold in the event classification module 112.

Compared to the human-in-the-loop supervised learning-based threshold tuning, the automatic monitoring system may automate the threshold tuning based on heuristic rules or a reinforced learning algorithm. The automatic monitoring system may periodically review the misclassification rate (false positive and false negative rate) and tune the threshold value adaptively based on the misclassification rate. In one or more embodiments, the automatic monitoring system may continuously collect the event detection and classification result generated by the event detection and classification module. Meanwhile, the automatic monitoring system may also continuously collect the true event that occurred and was recorded in the event log database. The automatic monitoring system may further reconcile each detected/classified event with the logged event based on time stamp and other cause/effect analysis approaches. Based on this information over a certain time period, the misclassification rate may be calculated. If the false positive rate or false negative rate does not change or reach to zero, then there is no change on the threshold value. If the false positive rate has been increased compared to the result calculated over the previous periods, then the threshold may automatically increase by a certain percentage. Alternatively, if the false negative rate has been increased compared to the result calculated over the previous periods, then the threshold may automatically decrease by a certain percentage. The amount of increase or decrease value for the threshold may be based on a transfer function between the change of misclassification and the threshold value. Other factors including operating condition, network topology, ambient conditions may also be taken into account when determining the amount of increase or decrease value for the threshold, based on machine learning method, such as the well-known reinforced learning.

As described above, in one or more embodiments, PMU data besides voltage angle data ("other PMU data") may be used by the event classification module 112. It is noted that the other PMU data may optionally be used in addition to the voltage angle data, to potentially obtain even higher true positive and true negative classification rates. This other PMU data may be leveraged to provide an estimate regarding the presence of coherency (or lack thereof) between a measured node and a neighboring unmeasured node (e.g., does not have a PMU). Conventionally, a determination of the coherency between these two nodes would require a direct measurement of voltage angle of both nodes. However, in this non-exhaustive example, the neighboring node does not have a PMU for direct measurement. Using current magnitude, current phase angle, voltage magnitude and voltage phase angle information from the PMU for the measured node, the classification module 112 may calculate an active power signal. As used herein, "active power" may refer to the rate of transfer of useful energy from one part of the system to another. As used herein, "reactive power" describes energy that moves back and forth in the transmission line, but does not do any useful work for the end user of the electricity. Active power may be calculated using voltage and current measurements. In one or more embodiments the PMU may calculate active and reactive power and include them in the synchrophasor data. The active power signal is typically a smooth signal with little to no oscillation. However, after an event, the active power signal may be oscillatory instead of smooth, and is then an active power oscillation. In the aftermath of a transient, in a case that a large active power oscillation is observed on the transmission line connecting the measured node to the neighboring unmeasured node, it may be inferred that the unmeasured node is incoherent with the measured node. Under such circumstances, a right singular vector for the measured nodes may be augmented with a new element corresponding to the unmeasured node to generate an RSV that is associated not just with the measured nodes, but also the unmeasured node. The value of the new element may be equal in magnitude to the measured node, but opposite in sign. Alternatively, in the case that no large active power oscillation is observed, the new RSV element may be equal, in both magnitude and sign, to the RSV element corresponding to the measured node.

As described above, one or more embodiments may be used in coordination with an additional data estimation algorithm to reduce the attack surface of the control center through cyber-hardening a key channel into the EMS that would otherwise be available to the mal-doer. Cyber-hardening may be accomplished by substituting the data from sensors known to be compromised using estimated sensor data. These estimated values may be obtained through additional online or near-real time methods that predict what the data should be based on knowledge of the physical network, knowledge of past sliding window data, and/or uncompromised data channels or nodes. Compromised sensors may be identified by examining the right singular vectors associated with largest singular values of the current sliding window of sensor data, in the case that the classification module has already identified that the current sliding window contains bad data or data corresponding to a cyber-attack. If a particular element of one such right singular vector is larger than a threshold value, then the sensor associated with that element of the right singular vector may be identified as compromised. One near-real-time method to estimate the correct sensor data may be to store in memory the singular values and singular vectors that were previously calculated for each of the past several sliding windows of synchrophasor data, calculate trends in the significant singular values, and extrapolate the trends to estimate the correct sensor data values of the current sliding window. In this method, based on the past several sliding windows of data, a linear trendline may be calculated for each of the significant singular values. Only the significant singular values associated with the most significant singular values could be studied. The most significant singular values are identified by determining a ratio of the largest singular value to each of the other singular values. When the ratio exceeds (or falls below, depending on the construction) a threshold value for all of the studied past sliding windows, that singular value is considered significant. The calculated trendlines would be used to extrapolate what the new singular values of the current window of data should be. Using the significant singular values extrapolated for the current sliding window of data, and the associated singular vectors of the previous sliding window of data, an estimate of the current sliding window of sensor data may be reconstructed. In the current sliding window, only the sensor data from the sensors identified to be compromised may be replaced with estimated values.

FIG. 1 is a block diagram of system architecture 100 according to some embodiments. Embodiments are not limited to architecture 100.

Architecture 100 includes a platform 103 for the power system, an event detection and classification module 104, a user platform 105, a data store 138 (e.g., database). In one or more embodiments, the event detection and classification module 104 may reside on the platform 103. Platform 103 provides any suitable interfaces through which users 105/other systems 107 may communicate with the event detection and classification module 104.

In one or more embodiments, the output of the event detection and classification module 104 may be output to a user platform 105 (a control system, a desktop computer, a laptop computer, a personal digital assistant, a tablet, a smartphone, etc.) to view information about and/or manage the operation of the system in accordance with any of the embodiments described herein. In one or more embodiments, the output of the module 104 may be used to control the power system 100. In one or more embodiments, the output from the event detection and classification module 104 may be transmitted to various user platforms or to other system (107), as appropriate (e.g., for display to, and manipulation by, a user).

In one or more embodiments, the system 100 may include one or more processing elements 109 and a memory/computer data store 138. The processor 109 may, for example, be a microprocessor, and may operate to control the overall functioning of the event and classification module 104. In one or more embodiments, the event and classification module 104 may include a communication controller for allowing the processor 109 and hence the event and classification module 104, to engage in communication over data networks with other devices (e.g., the PMUs106 and user interface 105).

In one or more embodiments, the system 100 may include one or more memory and/or data storage devices 138 that store data that may be used by the module. The data stored in the data store 138 may be received from disparate hardware and software systems associated with the power system, or otherwise, some of which are not inter-operational with one another. The systems may comprise a back-end data environment employed by a business, industrial or personal context.

In one or more embodiments, the data store 138 may comprise any combination of one or more of a hard disk drive, RAM (random access memory), ROM (read only memory), flash memory, etc. The memory/data storage devices 138 may store software that programs the processor 109 and the event and classification module 104 to perform functionality as described herein.

As used herein, devices, including those associated with the system 100 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Turning to FIG. 6, a chart 600 of parameters 602 and decision thresholds used by the event detection and classification module 104 is provided. The chart 600 includes parameters 602, tasks or flow chart steps the parameter is relevant to 604 and non-exhaustive values 606. For example, the window size parameter 602 is relevant to the window data with the SVD, and non-exhaustive values for the windows are 50-200.

Figure 7:
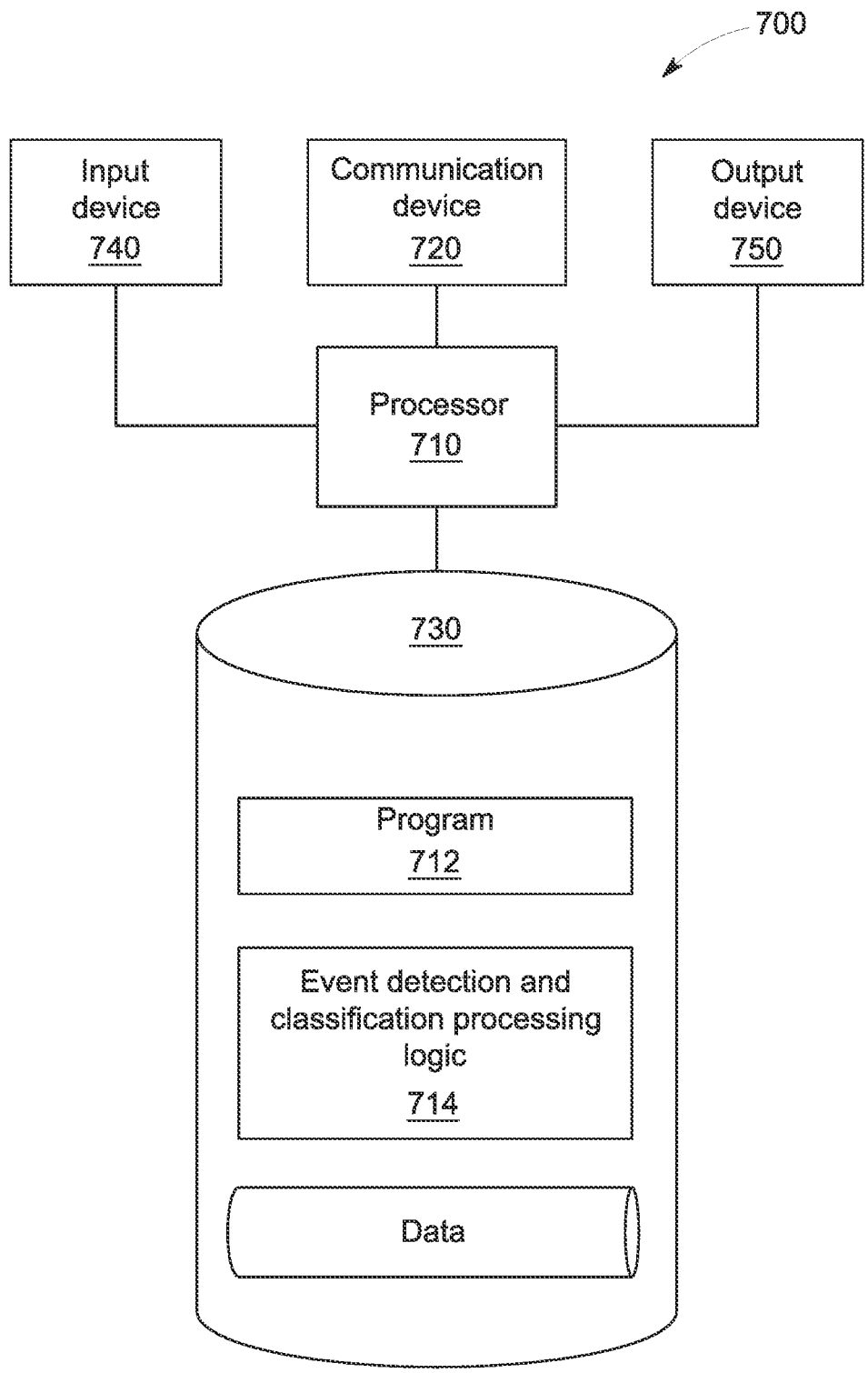
FIG. 7 illustrates a block diagram of a system according to some embodiments.
Figure 8:
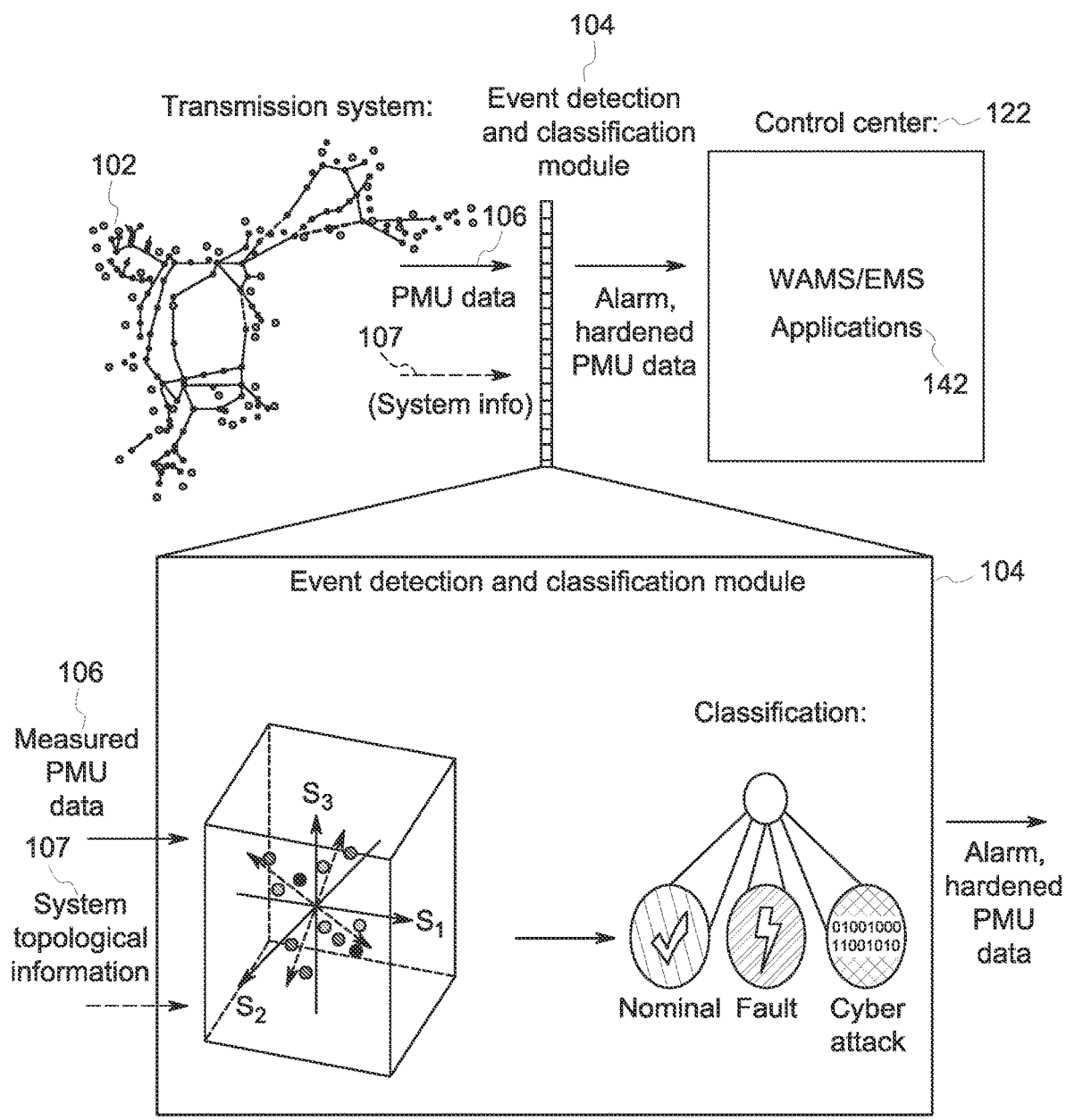
FIG. 8 illustrates a block diagram according to some embodiments.

Note the embodiments described herein may be implemented using any number of different hardware configurations. For example, FIG. 7 illustrates an event and classification processing platform 700 that may be, for example, associated with the system 100 of FIG. 1. The event and classification processing platform 700 comprises an event and classification processor 710 ("processor"), such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more users. The event and classification processing platform 700 further includes an input device 740 (e.g., a mouse and/or keyboard to enter information about the part) and an output device 750 (e.g., to output and display the data and/or recommendations).

The processor 710 also communicates with a memory/storage device 730. The storage device 730 may comprise any appropriate information storage device, including combinations of magnetic storage devices (e.g., a hard disk drive), optical storage devices, mobile telephones, and/or semiconductor memory devices. The storage device 730 may store a program 712 and/or event and classification processing logic 714 for controlling the processor 710. The processor 710 performs instructions of the programs 712, 714, and thereby operates in accordance with any of the embodiments described herein. For example, the processor 710 may receive input and then may apply the event and classification module 104 via the instructions of the programs 712, 714 to determine whether an event has occurred, and if an event has occurred, classify the event.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a parameter development module. The method steps can then be carried out using the distinct software modules and/or sub-modules of the system, as described above, executing on one or more hardware processors 710 (FIG. 7). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method comprising:
receiving, via a communication interface of an event detection and classification module comprising a processor, data from a plurality of sensors in a system, the data including a first data point and a second data point, wherein the event detection and classification module includes a detection module and a classification module;
determining an event occurred based on a change in measurements of the received first data point compared to the second data point and the change is within a pre-set magnitude and within a pre-defined amount of time;
applying a coherency similarity process to the received data via a classification module, wherein the coherency similarity process determines for the received data, which sensors of the plurality of sensors oscillate together before settling back to equilibrium and which sensors of the plurality of sensors oscillate out of phase before settling back to equilibrium, and the classification module determines whether the received data is similar to expected data for the event based on the applied coherency similarity process, and the similarity is within one of a threshold value and a range of values;
determining whether the event is an actual event or a mal-doer event based on an output of the classification module;
transmitting the determination of the event as the actual or the mal-doer event; and
modifying operation of the system based on the transmitted output.

2. The method of claim 1, wherein the data is synchrophasor data collected from phasor measurement units or Phasor Data Concentrators.

3. The method of claim 2, wherein the synchrophasor data includes at least one of voltage angle current angle, voltage magnitude, current magnitude, and active power.

4. The method of claim 2, wherein determining whether the event is the actual event or mal-doer event further comprises:
calculating an event singular value decomposition for the received data based on the application of the coherency similarity process;
identifying a post-event right singular value based on the calculated post-event singular value decomposition;
comparing the post-event right singular value to a reference value for a same at least one pair of sensors of the plurality of sensors to output a classification threshold value; and
determining whether the classification threshold value is one of inside or outside a predetermined value or range of values.

5. The method of claim 4, wherein the reference value is at least one of a synthetic right singular vector (RSV) and a historical RSV.

6. The method of claim 4 wherein the event singular value decomposition is based on a moving window data of an electrical signal.

7. The method of claim 6, wherein a window size of the moving window of data is determined based on model analysis using at least one of a network admittance matrix, generator location and inertia, load location and magnitudes.

8. The method of claim 4, wherein the coherency process outputs a right singular vector as a coherency value.

9. The method of claim 4, wherein comparing the post-event right singular value to the reference value is a measure of one of: rotation angle, Manhattan distance, Euclidean distance, or Chebyshev distance.

10. The method of claim 4, wherein classification threshold value is updated based on at least one of: an output of the event classification module, a user input, learning from historical data.

11. A system comprising:
an event detection and classification module, including an event detection module and a classification module;
an event detection and classification processor; and
a memory storing program instructions, the event detection and classification processor and the event detection and classification module operative with the program instructions to perform functions as follows:
receive data from a plurality of sensors in the system, the data including a first data point and a second data point;
determine an event occurred based on a change in measurements of the received first data point compared to the second data point and the change is within a pre-set magnitude and within a pre-defined amount of time;
apply a coherency similarity process to the received data, wherein the coherency similarity process determines for the received data, which of the plurality of sensors oscillate together before settling back to equilibrium and which sensors of the plurality of sensors oscillate out of phase before settling back to equilibrium, and the classification module determines whether the received data is similar to expected data for the event based on the applied coherency similarity process, and the similarity is within one of a threshold value and a range of values;

determine whether the event is an actual event or a mal-doer event based on an output of the classification module;

transmit the determination of the event as the actual or the mal-doer event; and modify operation of the system based on the transmitted output.

12. The system of claim 11, wherein the data is synchrophasor data collected from phasor measurement units or Phasor Data Concentrators.

13. The system of claim 12, wherein the synchrophasor data includes at least one of voltage angle current angle, voltage magnitude, current magnitude, and active power.

14. The system of claim 11, wherein determining whether the event is the actual event or mal-doer event further comprises program instructions to perform the functions as follows:

calculate an event singular value decomposition for the received data based on the application of the coherency similarity process;

identify a post-event right singular value based on the calculated post-event singular value decomposition;

compare the post-event right singular value to a reference value for a same at least one pair of sensors of the plurality of sensors to output a classification threshold value; and determine whether the classification threshold value is one of inside or outside a predetermined value or range of values.

15. The system of claim 14, wherein the reference value is at least one of a synthetic right singular vector (RSV) and a historical RSV.

16. The system of claim 14, wherein the event singular value decomposition is based on a moving window data of an electrical signal.

17. A non-transitory computer-readable medium storing instructions that, when executed by a computer processor, cause the computer processor to perform a method comprising:

receiving, via a communication interface of an event detection and classification module comprising a processor, data from one or more sensors in a system;

determining an event occurred based on the received data based on a change in measurements of the received data within a pre-set magnitude and within a pre-defined amount of time;

applying a coherency similarity process to the received data via a classification module, wherein the coherency similarity process determines whether the received data is similar to expected data for the event, and the similarity is within one of a threshold value and a range of values;

determining whether the event is an actual event or a mal-doer event based on an output of the classification module, wherein the determination further comprises:

comparing a post-event right singular value to a reference value for a same at least one pair of nodes to output a classification threshold value; and determining whether the classification threshold value is one of inside or outside a predetermined value or range of values;

transmitting the determination of the event as the actual or the mal-doer event; and modifying operation of the system based on the transmitted output.

18. The medium of claim 17, wherein the system is a power network and the one or more sensors are associated with a plurality of nodes in the power network.

19. The medium of claim 17, wherein determining whether the event is the actual event or mal-doer event further comprises instructions to perform a method comprising:

calculating an event singular value decomposition for the received data based on the application of the coherency similarity process; and identifying the post-event right singular value based on the calculated post-event singular value decomposition, wherein the identification is prior to the comparison of the post-event right singular value to the reference value.

* * * * *

UNITED STATES PATENT AND TRADEMARK OFFICE
CERTIFICATE OF CORRECTION

| | | |
|---|---|---|
| PATENT NO. | : 12,039,045 B2 | Page 1 of 1 |
| APPLICATION NO. | : 18/065998 | |
| DATED | : July 16, 2024 | |
| INVENTOR(S) | : Philip Joseph Hart et al. | |

It is certified that error appears in the above-identified patent and that said Letters Patent is hereby corrected as shown below:

In the Specification

Column 1, Line 4, please add the following:
-- GOVERNMENT SUPPORT
This invention was made with government support under DE-OE0000830 awarded by the U.S. Department of Energy ("DOE"). The government has certain rights in the invention. --

Signed and Sealed this
Seventh Day of January, 2025

Derrick Brent
*Acting Director of the United States Patent and Trademark Office*